(12) United States Patent
Zimmermann

(10) Patent No.: US 12,472,967 B2
(45) Date of Patent: Nov. 18, 2025

(54) INTELLIGENT HEAD-UP DISPLAY

(71) Applicant: Volkswagen Aktiengesellschaft, Wolfsburg (DE)

(72) Inventor: Philip Zimmermann, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 115 days.

(21) Appl. No.: 18/019,206

(22) PCT Filed: Jul. 21, 2021

(86) PCT No.: PCT/EP2021/070373
§ 371 (c)(1),
(2) Date: Feb. 1, 2023

(87) PCT Pub. No.: WO2022/028892
PCT Pub. Date: Feb. 10, 2022

(65) Prior Publication Data
US 2023/0271622 A1     Aug. 31, 2023

(30) Foreign Application Priority Data
Aug. 6, 2020  (DE) .......................... 102020209971.5

(51) Int. Cl.
*B60W 50/14* (2020.01)
*B60K 35/10* (2024.01)
(Continued)

(52) U.S. Cl.
CPC ............. *B60W 50/14* (2013.01); *B60K 35/10* (2024.01); *B60K 35/22* (2024.01); *B60K 35/235* (2024.01);
(Continued)

(58) Field of Classification Search
None
See application file for complete search history.

(56) References Cited

U.S. PATENT DOCUMENTS 9,649,979 B2 * 5/2017 Sakai .................... B60W 40/00
9,690,104 B2 * 6/2017 Kim .................... G02B 27/0093
(Continued)

FOREIGN PATENT DOCUMENTS

DE      19813300 A1    10/1999
DE      10336329 A1     3/2005
(Continued)

OTHER PUBLICATIONS

PCT/EP2021/070373. International Search Report (Oct. 20, 2021).
(Continued)

*Primary Examiner* — Muhammad Adnan
(74) *Attorney, Agent, or Firm* — Peter Zura; LOZA & LOZA, LLP

(57) ABSTRACT

Technologies and techniques for displaying information for an occupant of a motor vehicle. The display position of a head-up display is able to be varied flexibly depending on the context. To this end, both a displacement of the X and/or Y position and a color selection adapted to the background may be implemented and be performed automatically. Information from the steering angle, speed, map data and also head tracking by the interior camera may be combined to determine the X and/or Y position. In order to achieve optimum visibility for any load case, sensor fusion from the position data and an exterior camera may take place: Content or information (24) may thus be displayed depending on the current display position, so as to be more visible. If only some of the information is on a background, only some of the color may also change.

18 Claims, 4 Drawing Sheets

(51) Int. Cl.
   *B60K 35/22*   (2024.01)
   *B60K 35/235*  (2024.01)
   *B60K 35/28*   (2024.01)
   *B60K 35/29*   (2024.01)
   *B60K 35/81*   (2024.01)
   *B60K 35/60*   (2024.01)

(52) U.S. Cl.
   CPC ............ *B60K 35/285* (2024.01); *B60K 35/81* (2024.01); *B60K 35/28* (2024.01); *B60K 35/29* (2024.01); *B60K 35/60* (2024.01); *B60K 2360/177* (2024.01); *B60K 2360/178* (2024.01); *B60K 2360/1868* (2024.01); *B60K 2360/188* (2024.01); *B60W 2050/146* (2013.01); *B60W 2540/225* (2020.02); *B60W 2556/35* (2020.02)

(56) References Cited

U.S. PATENT DOCUMENTS

| | | | | |
|---|---|---|---|---|
| 10,000,153 | B1* | 6/2018 | Misu | G06T 11/60 |
| 10,281,721 | B2* | 5/2019 | Bhalla | G06V 40/172 |
| 10,510,276 | B1 | 12/2019 | Lee | |
| 10,748,425 | B2* | 8/2020 | Takemori | G08G 1/166 |
| 11,390,215 | B2* | 7/2022 | Lerzer | H04N 21/258 |
| 2005/0154505 | A1* | 7/2005 | Nakamura | G02B 27/01 701/1 |
| 2013/0076787 | A1 | 3/2013 | Mathieu et al. | |
| 2014/0310594 | A1* | 10/2014 | Ricci | G05D 1/0016 715/702 |
| 2016/0009289 | A1* | 1/2016 | Voelkel | B60W 50/14 340/425.5 |
| 2016/0163108 | A1* | 6/2016 | Kim | G02B 27/0101 345/633 |
| 2017/0032576 | A1* | 2/2017 | Mazoyer | G06F 3/0482 |
| 2017/0329001 | A1* | 11/2017 | Brandt | G06V 20/58 |
| 2018/0204365 | A1 | 7/2018 | Lee et al. | |
| 2019/0033586 | A1* | 1/2019 | Miyato | B60R 11/00 |
| 2020/0111445 | A1* | 4/2020 | Bianchi | G09G 3/2092 |
| 2020/0226963 | A1* | 7/2020 | Komori | G02B 26/0833 |
| 2021/0323410 | A1* | 10/2021 | Huber | G02B 5/045 |
| 2022/0080832 | A1* | 3/2022 | Matsui | H04N 9/3185 |
| 2022/0324473 | A1* | 10/2022 | Gläser | B60W 50/08 |
| 2025/0116523 | A1* | 4/2025 | Bagon | B60K 35/23 |

FOREIGN PATENT DOCUMENTS

| | | | |
|---|---|---|---|
| DE | 102007035505 A1 | 1/2009 | |
| DE | 102016203080 A1 | 8/2017 | |
| DE | 102017208339 A1 | 11/2018 | |
| DE | 102017216774 A1 | 3/2019 | |
| DE | 112017003916 T5 | 5/2019 | |
| DE | 102018004662 A1 | 12/2019 | |
| DE | 102019217250 A1 | 5/2021 | |
| EP | 3454013 A1 | 3/2019 | |
| KR | 20180071137 A | 6/2018 | |
| WO | WO-2018162392 A1 * | 9/2018 | ............ B60K 35/00 |

OTHER PUBLICATIONS

DE102020209971.5. Office Action (Jun. 30, 2021).
Corresponding European Application No. 21745354.7. Examination Report (Jan. 30, 2025).

* cited by examiner

INTELLIGENT HEAD-UP DISPLAY

RELATED APPLICATIONS

The present application claims priority to International Patent App. No. PCT/EP202021/070373 to Zimmermann, filed Jul. 21, 2021, titled "Intelligent Head-Up Display" which further claims priority to German Pat. App. No. 10 2020 209 971.5 filed Aug. 6, 2020, each the contents being incorporated by reference in their entirety herein.

TECHNICAL FIELD

The present disclosure relates to a device for displaying a notice for an occupant of a motor vehicle as well as to a corresponding system, method and computer program.

BACKGROUND

It is known to use so-called head-up display devices in vehicles for displaying information. A portion of information, such as instantaneous driving speed, is projected onto the windshield and visually superimposed on the image behind the windshield. These display devices generally include a projector, which projects the light emitted by the display onto the windshield, the windshield acting as a combiner and reflecting the light, and thereby providing a virtual image, which is visible to the driver, in front of the windshield. The disadvantage of such systems is that a portion of the image behind the windshield is always at least partially covered, so that relevant information from the image behind the windshield is difficult for a driver to spot. Additionally, the attention and viewing direction of the driver is drawn to the projection on the windshield. The driver's attention to information of the image behind the windshield is decreased.

The publication DE 198 13 300 A1 relates to a display device, in particular an occupant information system for motor vehicles, comprising a unit for projecting at least one virtual image in front of a windshield of the motor vehicle. It is provided that a position of the at least one virtual image in front of the windshield can be varied as a function of at least one driving condition parameter. The disadvantage is that only one driving condition parameter is taken into consideration, while a viewing direction of the driver as well as the roadway condition are not considered. In this way, for example, a pothole may be concealed by the virtual image and may be recognized by the driver only poorly or not at all, which results in an increased risk of accidents.

The publication DE 103 36 329 A1 relates to a method, to a device, and to a processing unit for improving the view in a motor vehicle. An image section is provided from the image of the environment of the motor vehicle, which is captured by a camera of the motor vehicle, wherein the size of the image section and, additionally or alternatively, the position of the image section within the image are adjusted as a function of the course of the road and/or the current driving of the motor vehicle and/or the driving direction of the motor vehicle desired by the driver. The disadvantage here is that only a predetermined trajectory of the motor vehicle is taken into consideration. The disclosed teaching does not allow to deliberately guide the driver's gaze, for example when a hazard source is identified, toward the hazard source. Moreover, it cannot be ensured that the driver will promptly detect the image section since an eye position or viewing direction of the driver is not being determined.

The publication DE 10 2007 035 505 A1 describes a motor vehicle comprising a head-up display for displaying information, wherein the information displayed by the head-up display is visible from a spatial element within the motor vehicle, comprising an adjusting unit for adjusting the position of the spatial element, comprising a detection unit for detecting the position of the eyes or of the head of a driver of the motor vehicle, and comprising a control unit, which is configured in such a way and coupled to the adjusting unit and the detection unit that the position of the spatial element is adjusted as a function of the detected position of the eyes or of the head of a driver. The disadvantage here is that only the eye position of the driver is detected for achieving improved visibility of the information. A transmission of further information by way of the position of the notice on the windshield and/or by subtle guidance of the driver's gaze are not achieved.

The unexamined patent application DE 10 2018 004 662 A1 relates to an optical detection system, in particular for a driver assistance system for detecting the roadway area/driving trajectory located in the driving direction, including a detection area for capturing a section of the environment, comprising an image recorder chip, which has a certain maximum number of pixels, wherein a certain number of pixels in a pixel area to be evaluated of the image receiver chip is active when the image of the environment is being captured, wherein the maximum number of pixels of the image receiver chip is greater than the number of pixels of the pixel area to be evaluated, and wherein the detection area is variable, wherein the variation and/or alignment of the detection area with the driving trajectory situated ahead are carried out by changing the pixel area to be evaluated on the image receiver chip, wherein a) control parameters supplied for this purpose serve as input parameters, which stem from further systems present in the motor vehicle and/or are provided by means of these systems, and/or b) for this purpose control parameters ascertained by the ego vehicle serve as input parameters, which stem from the optical detection system and/or are provided by means of the optical detection system. This disadvantage here is that no smart further processing of the detected information takes place. In particular, the only option that is disclosed in the publication is that a notice is output.

SUMMARY

Aspects of the present disclosure are directed to technologies and techniques for displaying a notice for an occupant of a motor vehicle, which at least partially overcomes the aforementioned disadvantages. In particular, an intelligent device that is at least partially tailored to the occupant is to be created.

In some examples, a device is disclosed for displaying a notice for an occupant of a motor vehicle, comprising: an input interface for receiving data including information regarding the notice for the occupant; an analysis unit for analyzing the data and generating a control command, the control command effectuating an optical output of the notice in the form of a notice symbol by means of an augmented reality display unit; and an output interface for transmitting the control command to an augmented reality display unit; wherein the control command effectuates a predefined optical output of the notice at a predefined position in the field of vision of the occupant.

In some examples, a system is disclosed for displaying a notice for an occupant of a motor vehicle, comprising: a unit for determining information to be transmitted to the occupant by means of the notice symbol; a device as defined above; and an augmented reality display unit for outputting a notice according to the predefined optical output at a predefined position in the field of vision of the occupant in response to a control command of the device.

In some examples, a method is disclosed for displaying a notice for an occupant of a motor vehicle utilizing a system as defined above, comprising: receiving data including information regarding the notice for the occupant; analyzing the data; generating a control command, wherein the control command effectuates an optical output of the notice in the form of a notice symbol by means of an augmented reality display unit; and transmitting the control command to an augmented reality display unit, wherein the control command effectuates a predefined optical output of the notice at a predefined position in the field of vision of the occupant.

In some examples, a computer program is disclosed, including program code means for carrying out all the steps of methods described herein, when the computer program is being executed on a computer or a corresponding processing unit.

By using an input interface for receiving data including information regarding the notice for the occupant, a technologically simple and cost-effective device can be created, which does not have to be designed itself to detect the information. The device can thus be integrated into existing navigation systems or infotainment systems. A control command for an augmented reality (AR) display unit makes an improved visualization of the information for an occupant possible. In particular, a driver may direct his or her gaze at the roadway, and does not need to look at an additional display in the motor vehicle. This increases safety in traffic. By means of an output interface, it is possible to utilize components that are already installed in the motor vehicle for display. Furthermore, it is conceivable to retrofit a display unit and/or to utilize multiple display units combined. As a result of optically outputting a notice symbol in a predefined manner at a predefined position in the field of vision of the occupant, the occupant is able to detect the information without having to adapt his or her field of view. Furthermore, it is also conceivable to direct the gaze of the field of vision of the occupant by outputting the notice at a predefined position, and thereby draw the attention of the occupants, for example, to a hazardous situation. By means of a predefined optical output, the visibility of the notice may be increased, for example a suitable color selection or a suitable contrast for the notice, based on the situation ahead of the motor vehicle, may be carried out, for example black lettering may be selected when the predefined position is situated ahead of a white truck.

Furthermore, the system may also be used for entertainment, for example games, such as, amongst others, "I spy with my little eye," Tetris, and/or Pong, can be implemented by a flexible contextual design. The predefined position and the predefined optical output are determined by parameters of the game.

In some examples, the device disclosed herein may be installed in a motor vehicle, and preferably is part of an on-board computer and/or navigation system. In this way, the comfort while driving in the car may be considerably increased. In particular, the device can also be offered as a kind of retrofit for passenger cars that were previously purchased, and can be set up, for example, by replacing or reprogramming the on-board electronic system.

In some examples, the input interface may be configured to receive sensor data of a sensor, including information regarding the field of vision of the occupant, wherein the analysis unit is designed to determine the predefined position in the field of vision of the occupant based on the sensor data. In this way, the visibility of the notice may be considerably improved. In some examples, the notice can be detected by the occupant without significantly changing the viewing direction.

In some examples, the input interface may be configured to receive sensor data of a sensor, which includes at least one steering angle sensor, a speed sensor, a position sensor, a head-tracking sensor, a passenger compartment camera, in particular an occupant camera, and/or an exterior camera, wherein data from at least two sensors, in particular of a position sensor and an exterior camera, can preferably be combined in a sensor fusion. In this way, the predefined position can be determined in an improved manner.

In some examples, the analysis unit may be configured to determine a hazard source in the field of vision of an occupant, such as the driver, wherein the control command effectuates a displacement of the notice symbol toward the hazard source in the field of vision of the occupant. In this way, safety in traffic can be enhanced, and the occupant can be alerted to the hazard source at an early stage. The comfort is also increased since preferably no audio warning or another warning signal has to be output to warn the occupant.

In some examples, the analysis unit may be configured to determine a predefined optical output, such as a color and/or a type of the notice symbol, based on a situation ahead of the motor vehicle in the field of vision of the occupant and the predefined position in the field of vision of the occupant, so as to effectuate an output of the notice symbol with increased visibility for the occupant by means of the control command. For example, a color or a structure of the situation ahead of the motor vehicle may be determined by way of a sensor, such as an exterior camera, wherein the predefined optical output can encompass modifying the contrast, contrast color and/or placing a background behind the notice.

In some examples, the augmented reality display unit may include a head-up display on a motor vehicle, wherein the head-up display is preferably designed to represent information at any position of the windshield of a motor vehicle. In this way, a notice can be output at a predefined position in a technologically simple manner. A projection unit of the head-up display and/or a mirror can be moved by means of actuators so as to enable a projection at the predefined position.

Further examples and preferred embodiments of the invention are derived from the remaining features described in the claims.

Aspects of the present disclosure can advantageously be combined with each other, unless they are implemented differently in the individual case.

BRIEF DESCRIPTION OF THE DRAWINGS

Aspects of the present disclosure will be described hereafter in exemplary embodiments based on the associated drawings. In the drawings.

DETAILED DESCRIPTION

Figure 1:
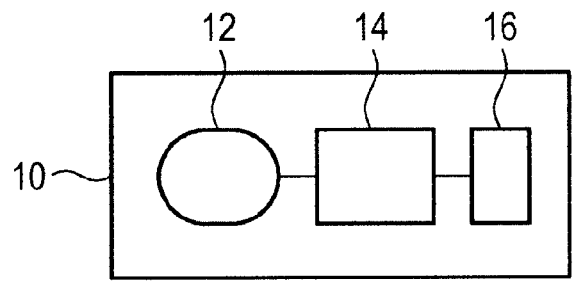
FIG. 1 shows an exemplary schematic illustration of a device for displaying a notice for an occupant of a motor vehicle, according to some aspects of the present disclosure.

FIG. 1 shows an exemplary schematic illustration of a device 10 for displaying a notice for an occupant of a motor vehicle. The device 10 comprises an input interface 12, an analysis unit 14, and an output interface 16.

The input interface 12 is configured to receive data including information regarding the notice for the occupant. The data can encompass a speed or a navigation notice, for example, and can stem from a speedometer, a GPS receiver and/or a navigation system, for example. For reception, the input interface 12 is preferably connected to a vehicle-internal transmission network. The input interface 12 can furthermore also be designed for wireless communication or be connected to a proprietary, for example hard-wired, transmission network.

The analysis unit 14 is configured to receive the data and to generate a control command, wherein the control command effectuates an optical output of the notice in the form of a notice symbol by means of an augmented reality display unit. The control command effectuates a predefined optical output of the notice at a predefined position in the field of vision of the occupant.

The output interface 16 is configured to transmit the control command to the augmented reality display unit. The output interface 16 can be designed for communication, analogously to the input interface 12. It shall be understood that the input interface 12 and the output interface 16 can also be designed to be combined, serving as a communication interface for transmission and reception.

Figure 2:
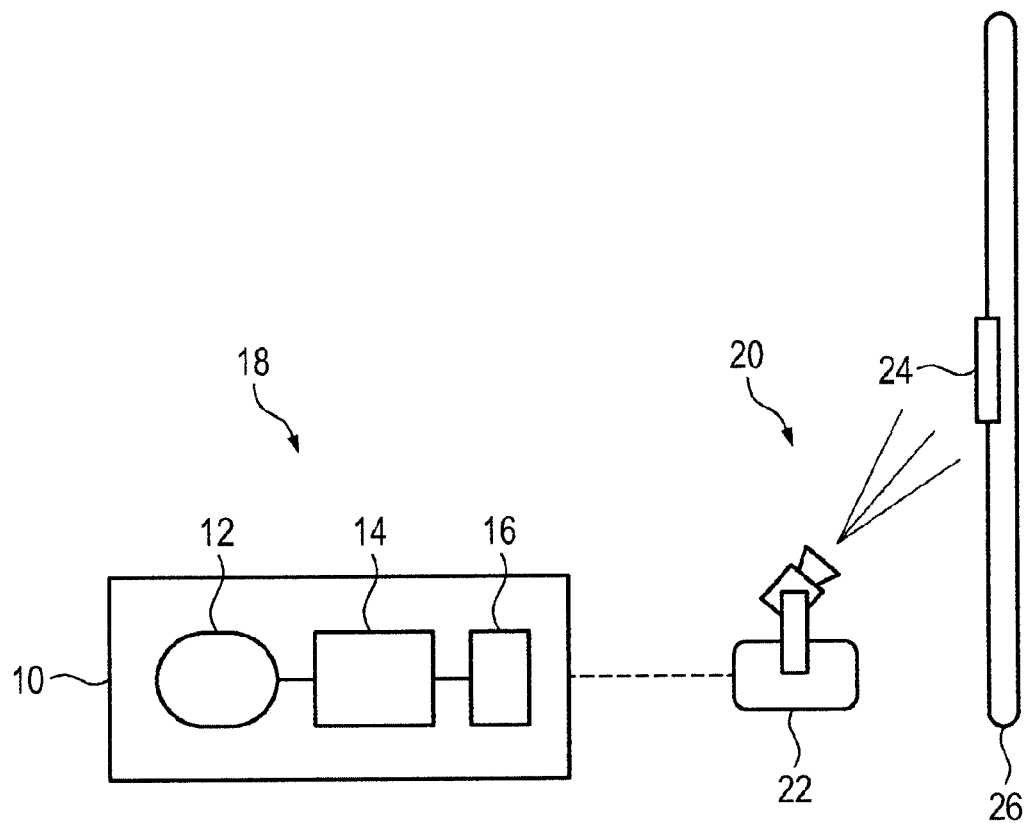
FIG. 2 shows a schematic illustration of one variant of a system according to some aspects of the present disclosure.

FIG. 2 shows an exemplary schematic illustration of a system 18, comprising a device 10 and an AR display unit 20 comprising a projection unit 22.

In some examples, the device 10 receives data including information regarding the notice. These data can be, for example, a speed of the motor vehicle, data of an eye tracking sensor, data about the traffic situation, position data of the motor vehicle, data regarding a position of a hazard source, and the like.

Based on the data, the device 10 creates a control command for the AR display unit 20 and thereby effectuates an output of a notice 24 with respect to information for an occupant on a windshield 26 of a motor vehicle. In the shown example, the AR display unit 20 comprises a head-up display, wherein the projection unit 22 is designed to be movable and, for example, can be moved by means of actuators so that the notice 24 can be projected at the predefined position in the field of vision of the occupant on the windshield 26. In this way, the notice symbol can be displayed directly at the windshield 26 of the motor vehicle.

Figure 3:
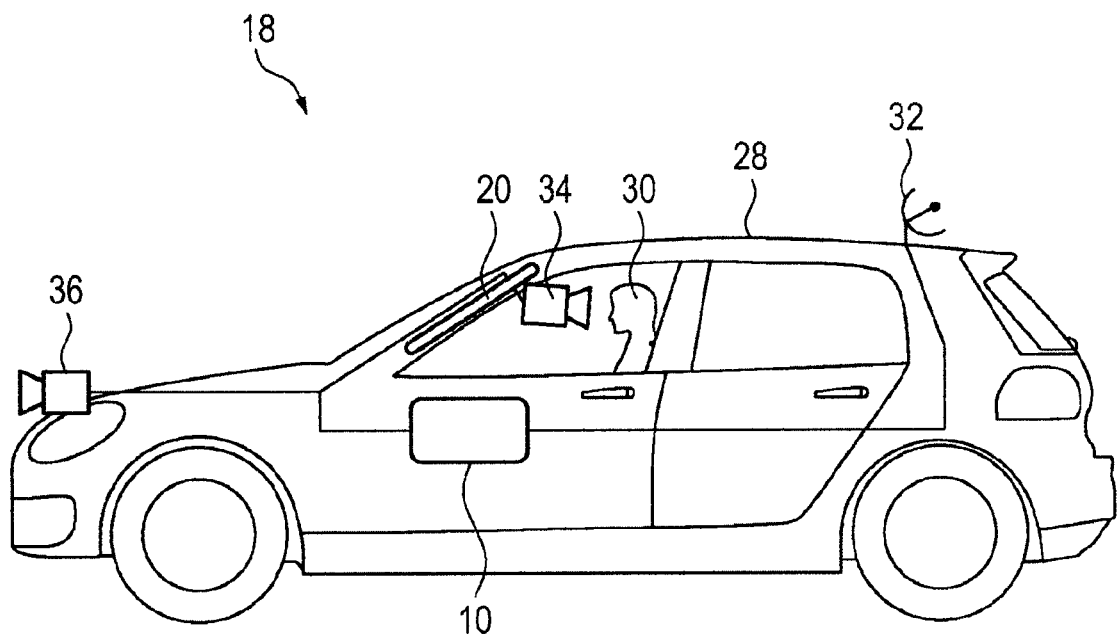
FIG. 3 shows a schematic illustration of another variant of a system in a vehicle, according to some aspects of the present disclosure.

FIG. 3 shows a schematic illustration of a variant of the system 18 according to aspects of the present disclosure in a motor vehicle 28. The system 18 in this example includes a device 10 and an AR display unit 20. In the shown example, the AR display unit 20 comprises a semi-transparent screen, which is arranged at the windshield 26 (not shown in greater detail) of the motor vehicle 28.

The device 10 receives data including information regarding the notice 24 for an occupant 30, as described above. In the shown example, the system 18 is designed as part of a navigation system and connected to a GPS receiver 32 for position determination or speed determination. It shall be understood that the system 18 can also be designed as an independent unit. In the shown example, the navigation system can form a unit that determines a piece of information, such as a navigation prompt to be transmitted to the occupant 30.

Further data can stem from an occupant camera 34, for example for determining a viewing direction of the occupant 30, or from an exterior camera 36, such as, for example, a front camera, for determining a situation ahead of the motor vehicle 28. It shall be understood that further sensors that, in principle, are known in the prior art can also be used. In particular, sensor data fusion of data from multiple sensors may be carried out so as to achieve a higher data quality.

The device 10 analyzes the received data and determines a control command, which effectuates an output of the notice 24 at a predefined position in the field of vision of the occupant 30.

Figure 4:
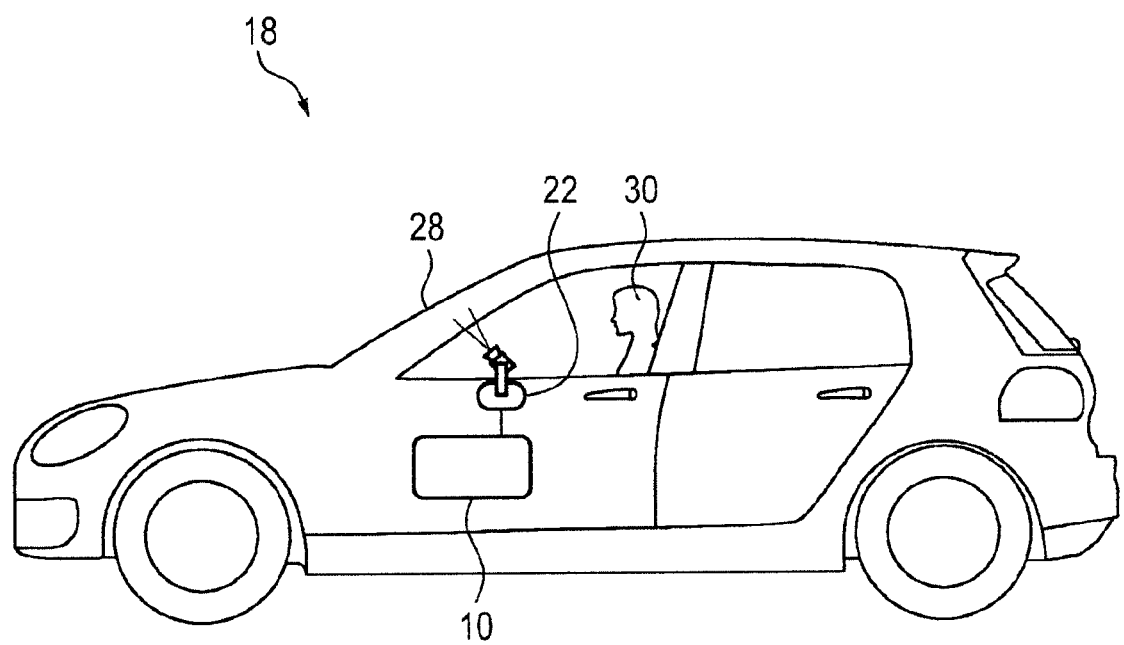
FIG. 4 shows a schematic illustration of another variant of a system in a vehicle, according to some aspects of the present disclosure.

FIG. 4 shows a schematic illustration of another variant of a system 18 according to some aspects in a motor vehicle 28. Identical reference numerals refer to identical features and will not be described again. Hereafter, essentially the differences compared to the variant shown in FIG. 3 are to be addressed.

In contrast to the variant shown in FIG. 3, the AR display unit 20 is implemented in the form of a head-up display, as has been described with respect to FIG. 2. Such a design is preferably suitable as a basic equipment variant since major structural modifications must be carried out in the motor vehicle 28 here to install an accordingly controllable projection unit 22. In particular, the windshield 26 of the motor vehicle 28 can be replaced in a technologically simple manner here since the windshield 26 is only a passive part of the AR display unit 20.

In the shown example, an illustration of the sensors was not shown for the sake of clarity and brevity.

Figure 5:
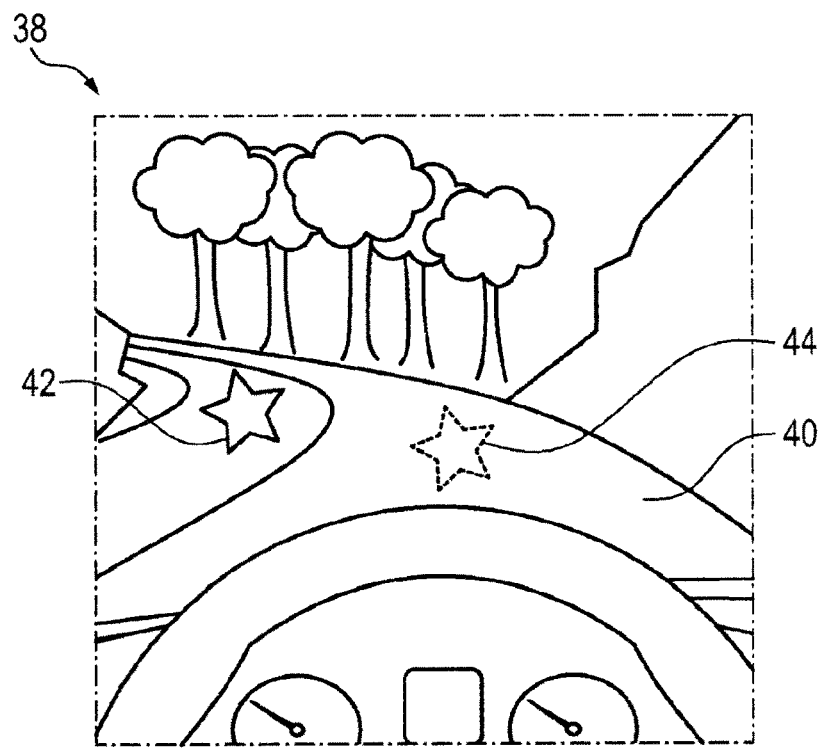
FIG. 5 shows a schematic illustration of an output of the system on an AR display unit, according to some aspects of the present disclosure.

FIG. 5 shows a schematic illustration of an output 38 of the system 18 on an AR display unit 20 in a driving situation. A scenario from the driver's perspective is shown. The driving situation encompasses the driving on a roadway 40 of a rural road. The notice symbol 42 is schematically illustrated as a star.

In the shown example, it is advantageous when a driver of the motor vehicle 28 directs his or her gaze at the apex of the curve, which is why the predefined position of the notice symbol 42 is the apex of the curve. The position of a notice symbol 44 known in the prior art is shown in dotted lines. By displaying the notice symbol 42 at the predefined position, the driver is able to detect the notice symbol 42 without have to avert his or her gaze from the apex of the curve. The visibility of the notice symbol 42 is increased. Furthermore, safety in road traffic is increased since the driver is encouraged to optimally guide his or her gaze.

Figure 6:
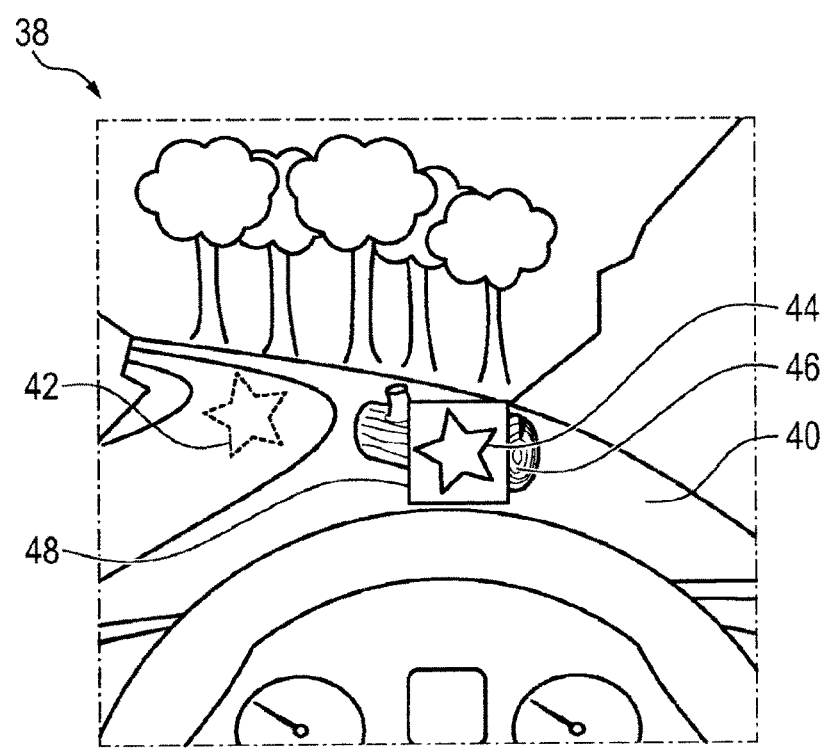
FIG. 6 shows a schematic illustration of an output of the system on an AR display unit in a driving situation, according to some aspects of the present disclosure.

FIG. 6 shows a schematic illustration of an output 38 of the system 18 on an AR display unit 20 in another driving situation. Identical reference numerals refer to identical features and will not be described again. Hereafter, the differences shall be addressed.

In contrast to the situation shown in FIG. 5, an obstacle 46 is situated ahead of the motor vehicle 28. In the shown example, the obstacle 46 encompasses a piece of wood on the roadway 40. The wood can become a hazard, in particular when a collision occurs between the motor vehicle 28 and the piece of wood. The analysis unit 14 is designed to recognize the impending hazard and, for this purpose, analyzes the image of an exterior camera 36, for example, in particular of a front camera, or other sensor data. So as to draw the attention of the driver to the impending hazard, the analysis unit 14 can generate a control command in order to display the notice 24 at the hazard source. In the shown example, the notice symbol 44 is thus displayed in such a way that, from the driver's view, it is located in front of the piece of wood. The predefined position in the field of vision of the driver is consequently in front of the piece of wood. It shall be understood that the above-described hazardous situation was only selected by way of example to explain the principle of the present teaching. A person skilled in the art will recognize that the teaching can be applied to a plurality of further hazardous situations.

In the shown example, the notice symbol 44 is furthermore optically output in a predefined manner. So as to increase the visibility or perceptibility of the notice symbol 44 for the occupant or driver, a background 48 is placed behind the notice symbol 44. It shall be understood that the predefined optical output can also encompass a change in color or contrast of the notice symbol 44.

Figure 7:
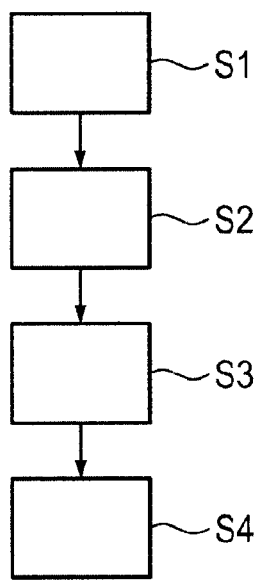
FIG. 7 shows a schematic illustration of a method according to some aspects of the present disclosure.

FIG. 7 schematically shows the steps of a method according aspects of the present disclosure for displaying a notice 24 for an occupant 30 of a motor vehicle 28. The method can preferably be carried out by means of the system 18, as described above, and encompasses the following steps. In a step S1, data including information regarding the notice 24 for the occupant 28 are received. A step S2 encompasses the analysis of the data. In a step S3, a control command is generated, wherein the control command effectuates an optical output of the notice 24 in the form of a notice symbol 42, 44 by means of an augmented reality display unit 20. A step S4 encompasses the transmission of the control command to an augmented reality display unit 20.

The control command effectuates an optical output of the notice 24 at a predefined position in the field of vision of the occupant 28.

It shall be understood that the method can be carried out by means of a computer program including program code means, wherein the program code means are designed to carry out all the steps of the method when the computer program is being executed on a computer or a corresponding processing unit, such as an on-board computer, a navigation system and/or infotainment system.

Aspects of the present disclosure were described in detail. Using the disclosed teaching, it is possible to achieve the following advantages and/or solve the following problems by at least one embodiment:

The display position of a head-up display can be varied flexibly as a function of the context.

To this end, both a displacement of the X and/or Y positions and a color selection that is adapted to the background can be implemented and be carried out automatically.

For the determination of the X and/or Y positions, information comprising the steering angle, speed, map data and also head tracking of the passenger compartment camera can be combined.

In particular, so as to achieve optimal visibility for any load scenario or application, sensor fusion from the position data and an external camera can be carried out. In this way, it is possible to represent content or notices as a function of the current display position in such a way that the content or notices is or are more visible. If only a portion of the notice or notice symbol is in front of a background, it is also possible that only a portion changes color, so that the visibility is ensured for the entire notice symbol.

In addition, by using visual warning colors and simultaneously displacing the display in the direction of a hazard source, the driver's gaze can be guided toward the hazardous situation.

LIST OF REFERENCE SIGNS

10 device
12 input interface
14 analysis unit
16 output interface
18 system
20 augmented reality display unit (AR display unit)
22 projection unit
24 notice
26 windshield
28 motor vehicle
30 occupant
32 GPS receiver
34 occupant camera
36 exterior camera
38 output
40 roadway
42 notice symbol
44 notice symbol
46 obstacle
48 background
S1-S4 method steps

The invention claimed is:

1. A device for displaying a notice for an occupant of a motor vehicle, comprising:
   an input interface for receiving data comprising information regarding the notice for the occupant, wherein the data includes operational, environmental, and/or occupant-specific parameters related to the vehicle or its surroundings;
   an analysis unit for analyzing the data and generating a control command, wherein the control command specifies a visual characteristic of a notice symbol, the visual characteristic being dynamically adaptable based on occupant-specific conditions, including the occupant's eye position, viewing direction, and/or contextual factors relating to a background behind the notice symbol within the occupant's field of vision, such that the notice symbol is rendered with a visual contrast relative to the background, to enhance visibility within the occupant's field of vision; and
   an output interface for transmitting the control command to an augmented reality display unit, wherein the augmented reality display unit being configured to effectuate an optical output of the notice symbol at a predefined position in a field of vision of the occupant, the predefined position being determined based on prior calibration data or fixed positional rules.

2. The device according to claim 1, wherein the device is configured as part of an on-board computer and/or navigation system, and further configured to be installed in a motor vehicle.

3. The device according to claim 1, wherein the input interface is configured to receive sensor data comprising information regarding the field of vision of the occupant, and wherein the analysis unit is configured to determine the predefined position in the field of vision of the occupant based on the sensor data.

4. The device according to claim 1, wherein the input interface is configured to receive a plurality of sensor data comprising at least two of steering angle sensor data, speed sensor data, position sensor data, head-tracking sensor data, passenger compartment camera data, and/or exterior camera, wherein the analysis unit is configured to combine the plurality of sensor data via sensor fusion.

5. The device according to claim 1, wherein the analysis unit is configured to determine a hazard source in the field of vision of the occupant, wherein the control command effectuates a displacement of the notice symbol toward the hazard source in the field of vision of the occupant.

6. The device according to claim 1, wherein the analysis unit is configured to determine a predefined optical output comprising a color and/or a type of the notice symbol, based on an object ahead of the motor vehicle in the field of vision of the occupant and the predefined position in the field of vision of the occupant, so as to effectuate an output of the notice symbol with increased visibility for the occupant via the control command.

7. A method for displaying a notice for an occupant of a motor vehicle, comprising:
receiving data via an input interface, the data comprising information regarding the notice for the occupant, wherein the data includes operational, environmental, and/or occupant-specific parameters related to the vehicle or its surroundings;
analyzing, via an analysis unit, the data and generating a control command, wherein the control command specifies a visual characteristic of a notice symbol, the visual characteristic being dynamically adaptable based on occupant-specific conditions, including the occupant's eye position, viewing direction, and/or contextual factors relating to a background behind the notice symbol within the occupant's field of vision, such that the notice symbol is rendered with a visual contrast relative to the background, to enhance visibility within the occupant's field of vision; and
transmitting, via an output interface, the control command to an augmented reality display unit, wherein the augmented reality display unit effectuates an optical output of the notice symbol at a predefined position in a field of vision of the occupant, the predefined position being determined based on prior calibration data or fixed positional rules.

8. The method according to claim 1, wherein the analysis unit is configured as part of an on-board computer and/or navigation system, and further configured to be installed in a motor vehicle.

9. The method according to claim 1, further comprising receiving sensor data comprising information regarding the field of vision of the occupant, and determining the predefined position in the field of vision of the occupant based on the sensor data.

10. The method according to claim 1, further comprising receiving a plurality of sensor data comprising at least two of steering angle sensor data, speed sensor data, position sensor data, head-tracking sensor data, passenger compartment camera data, and/or exterior camera,
and further comprising combining, via the analysis unit, the plurality of sensor data via sensor fusion.

11. The method according to claim 1, further comprising determining, via the analysis unit, a hazard source in the field of vision of the occupant, wherein the control command effectuates a displacement of the notice symbol toward the hazard source in the field of vision of the occupant.

12. The method according to claim 1, further comprising determining, via the analysis unit, a predefined optical output comprising a color and/or a type of the notice symbol, based on an object ahead of the motor vehicle in the field of vision of the occupant and the predefined position in the field of vision of the occupant, so as to effectuate an output of the notice symbol with increased visibility for the occupant via the control command.

13. A system for displaying a notice for an occupant of a motor vehicle, comprising:
an input interface for receiving data comprising information regarding the notice for the occupant, wherein the data includes operational, environmental, and/or occupant-specific parameters related to the vehicle or its surroundings;
an analysis unit for analyzing the data and generating a control command, wherein the control command specifies a visual characteristic of a notice symbol, the visual characteristic being dynamically adapted based on occupant-specific conditions, including the occupant's eye position, viewing direction, and/or contextual factors relating to a background behind the notice symbol within the occupant's field of vision, such that the notice symbol is rendered with a visual contrast relative to the background, to enhance visibility within the occupant's field of vision; and
an output interface for transmitting the control command to an augmented reality display unit, wherein the augmented reality display unit effectuates an optical output of the notice symbol at a predefined position in a field of vision of the occupant, the predefined position being determined based on prior calibration data or fixed positional rules.

14. The system according to claim 13, wherein the system is configured as part of an on-board computer and/or navigation system, and further configured to be installed in a motor vehicle.

15. The system according to claim 13, wherein the input interface is configured to receive sensor data comprising information regarding the field of vision of the occupant, and wherein the analysis unit is configured to determine the predefined position in the field of vision of the occupant based on the sensor data.

16. The system according to claim 13, wherein the input interface is configured to receive a plurality of sensor data comprising at least two of steering angle sensor data, speed sensor data, position sensor data, head-tracking sensor data, passenger compartment camera data, and/or exterior camera, wherein the analysis unit is configured to combine the plurality of sensor data via sensor fusion.

17. The system according to claim 13, wherein the analysis unit is configured to determine a hazard source in the field of vision of the occupant, wherein the control command effectuates a displacement of the notice symbol toward the hazard source in the field of vision of the occupant.

18. The system according to claim 13, wherein the analysis unit is configured to determine a predefined optical output comprising a color and/or a type of the notice symbol, based on an object ahead of the motor vehicle in the field of vision of the occupant and the predefined position in the field of vision of the occupant, so as to effectuate an output of the notice symbol with increased visibility for the occupant via the control command.

* * * * *